(No Model.)
F. H. MERRY.
PNEUMATIC HANDLE FOR HANDLE BARS OF BICYCLES.
No. 583,497. Patented June 1, 1897.
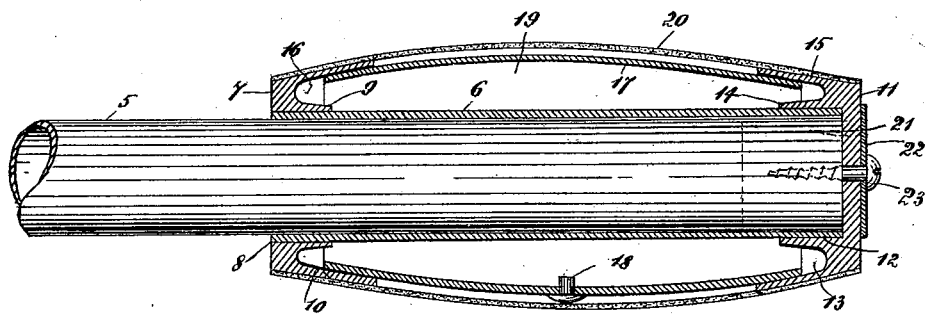
WITNESSES
INVENTOR
Frederick H. Merry,
BY
ATTORNEYS
THE NORRIS PETERS CO., PHOTO-LITHO., WASHINGTON, D. C.

United States Patent Office.

FREDERICK HARLEY MERRY, OF BROOKLYN, NEW YORK, ASSIGNOR OF ONE-HALF TO HARLEY MERRY, OF SAME PLACE.

PNEUMATIC HANDLE FOR HANDLE-BARS OF BICYCLES.

SPECIFICATION forming part of Letters Patent No. 583,497, dated June 1, 1897.

Application filed June 3, 1896. Serial No. 594,148. (No model.)

*To all whom it may concern:*

Be it known that I, FREDERICK HARLEY MERRY, a citizen of the United States, and a resident of Brooklyn, in the county of Kings and State of New York, have invented certain new and useful Improvements in Pneumatic Handles for Handle-Bars of Bicycles and Similar Vehicles, of which the following is a specification, reference being had to the accompanying drawing, forming a part thereof, in which similar numerals of reference indicate corresponding parts.

This invention relates to handles or grips for bicycles and similar vehicles; and the object thereof is to provide an improved pneumatic device of this class which is adapted to be connected with the handle-bars as now constructed or with any desired form of handle-bar; and with this and other objects in view the invention consists in the device hereinafter described and claimed.

The invention is fully disclosed in the following specification, of which the accompanying drawing forms a part, said drawing being a side view of a portion of a handle-bar and showing my improved handle or grip connected therewith and in central longitudinal section.

In the drawing forming part of this specification I have shown at 5 a portion of the handle-bar of a bicycle or similar vehicle, and in the practice of my invention I provide a handle which is adapted to be connected therewith and which consists of a central longitudinal tube 6, which is composed of rubber, rubber and canvas, or similar material, and on the inner end thereof is mounted a head 7, having a central opening 8, through which the end of the tube 6 passes, and said head 7 is provided adjacent to said central opening with an annular flange or rim 9 and on the outer perimeter thereof with a similar annular flange or rim 10, which is slightly conical in form and which is wider than the flange or rim 9, and on the opposite end of the tube 6 is placed a head 11, which is provided centrally and on the inner side thereof with a circular chamber 12, around which is formed a deep annular groove 13, whereby an annular flange or rim 14 is formed in which the end of the tube 6 fits, and also an annular flange or rim 15, which is similar in form to the annular flange or rim 10 on the head 7, and it will also be seen that between the flanges or rims 9 and 10 on the head 7 is an annular groove 16, similar to the annular groove 13 in the head 11, and said heads are preferably composed of rubber. I also provide a tubular casing 17, the ends of which are fitted within and secured to the annular flanges or rims 10 and 15, and said casing is composed of elastic rubber, rubber and canvas, or similar material, and is larger at the center thereof than at the ends, and secured in said casing at one side thereof is an ordinary air-valve 18, by means of which the chamber 19 within the casing 17 may be inflated whenever desired, an ordinary air-pump being employed for this purpose.

The air-valve 18 may be placed at any desired position and may be placed in the head 7 or 8, if desired, or in the annular flanges or rims 10 and 15, all that is necessary in this connection being to provide means whereby the casing 17, which forms the body of the handle, may be inflated. I also provide an outer covering or casing 20, which is designed to inclose the inner casing 17 and which is connected with the heads 7 and 11 in any desired manner and which is composed of cloth, canvas, leather, or any preferred material and which may be detached whenever desired. This covering or casing 20 may be connected with the handle by any preferred means, and the object thereof is to prevent the hand from coming in contact with the rubber casing 17.

The advantages of this form of handle will be apparent to all those accustomed to the use of bicycles and similar vehicles, and by means thereof the jolt and jar which are transmitted from the handles to the arms and body of the rider are avoided.

The outer end of the handle-bar is provided with a wooden plug 21, which is secured therein in any desired manner, said handle-bar being preferably tubular in form, and on the outer end of the head 11 is placed a metal plate 22, through which and through the head passes a screw 23, which also passes into said plug, and by means of this device the handle or grip is detachably connected with the handle-bar.

It is evident that changes in and modifications of the construction herein described may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

1. A handle for the handle-bars of bicycles and similar vehicles, said handle being adapted to be connected with said handle-bar, and being composed of a central longitudinal tube which is composed of rubber or similar material, and suitable heads connected therewith, one of which is provided with a central opening through which the end of the handle-bar is passed, and each of said heads being provided with an inwardly-directed flange or rim, to which said tube is secured, and at their perimeters with an inwardly-directed flange or rim which is slightly conical in form, and a tubular casing, the ends of which are fitted within said last-named flanges or rims, said casing being composed of rubber and being larger at the middle than at the ends, and being provided with a covering or casing which is composed of cloth or textile material, substantially as shown and described.

2. The combination with the handle-bars of a bicycle or similar vehicle of a central longitudinal tube of rubber or similar material a tubular head connected with one end of said tube, and provided with an inner and outer annular flange a similar head on the opposite end of said tube, a tubular casing surrounding the first tube, at a distance therefrom the ends of which outer tube are secured to the outer flanges of said heads, a valve in said casing and a superimposed covering connected to said heads substantially as described.

In testimony that I claim the foregoing as my invention I have signed my name, in presence of the subscribing witnesses, this 25th day of May, 1896.

FREDERICK HARLEY MERRY.

Witnesses:
CHARLES S. ROGERS,
C. S. MARRIN.